April 23, 1963
G. A. LEVINE
3,086,553
TWO-STAGE, TWO-FLUID, UNI-DIRECTIONAL CONTROL VALVE
Filed June 24, 1960
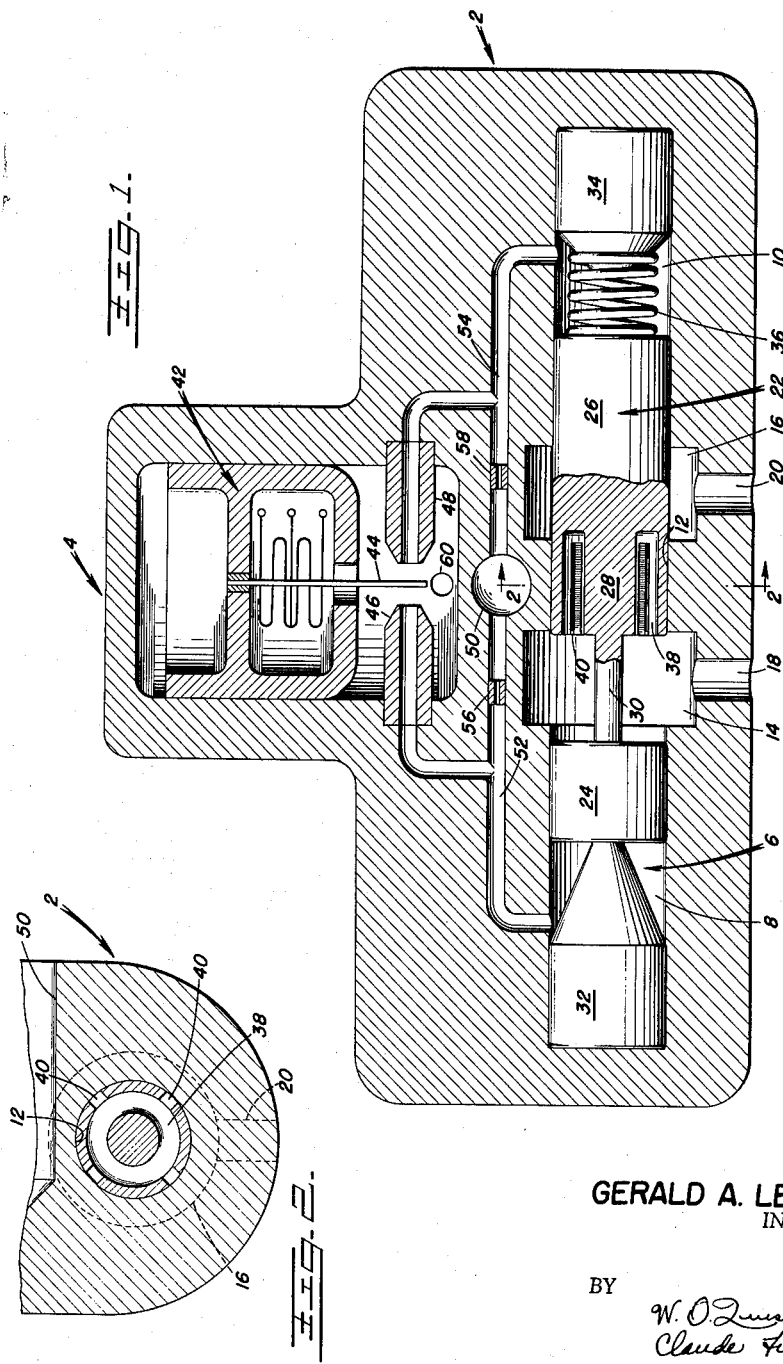
GERALD A. LEVINE
INVENTOR.
BY
ATTORNEYS "# United States Patent Office 3,086,553
Patented Apr. 23, 1963

3,086,553
TWO-STAGE, TWO-FLUID, UNI-DIRECTIONAL CONTROL VALVE
Gerald A. Levine, Silver Spring, Md., assignor to the United States of America as represented by the Secretary of the Navy
Filed June 24, 1960, Ser. No. 38,684
2 Claims. (Cl. 137—625.38)

This invention relates generally to flow control valves; more particularly, it relates to an improved, two-stage, two-fluid, uni-directional flow control valve.

In certain applications of flow control valves, particularly in guided missile fuel supply systems, a requirement exists for a physically small valve, that is, one capable of controlling fluid flow volumes in excess of 100 gallons per minute. The valve employed must be so constructed as to precisely and almost instantaneously adjust the rate of fluid flow to any value between zero and maximum. This invention is directed to such a flow control valve.

It is, therefore, the principal object of this invention to provide a flow control valve so constructed as to precisely regulate the flow of a large volume of fluid, and to provide almost instantaneous adjustments in the rate of such flow.

It is also an object of the invention to provide a spool for a flow control valve, said spool being so constructed as to permit flow to begin through the valve almost instantaneously upon its being moved to an open position.

Another object of the invention is to provide a flow control valve having a minimum of moving components, and that is mechanically simple in construction.

A further object of the invention is to provide a two-stage, two-fluid flow control valve, so constructed that the working fluid of the spool control stage of the valve can be different from, and at a substantially higher pressure than, the fluid flowing through the flow control stage.

Other objects and many of the attendant advantages of this invention will be readily appreciated as the same becomes better understood by reference to the following detailed description when considered in connection with the accompanying drawing, wherein:

FIG. 1 is a schematic view, generally in cross-section, of the flow control valve of the invention; and FIG. 2 is a view in cross-section, taken generally at 2—2 in FIG. 1, showing the construction of the spool of the valve.

The invention is directed to a two-stage, two-fluid, uni-directional flow control valve of the spool type. The first, or flow control, stage of the valve includes a spool of a novel design, which is disposed within a cylindrical bore contained within a valve body. The second, or spool control, stage includes a flapper-type electrical control unit, and functions to position the spool to allow for various rates of flow through the valve. The spool operates in a uni-directional manner; that is, fluid will flow through the flow control stage of the valve only when the spool moves in a particular direction.

It is a common practice in the valve art to employ a portion of the fluid flowing through the valve as the working fluid of a spool control stage. However, in certain applications the pressure of such fluid is insufficient to accurately position the spool under extreme environmental conditions. The present valve permits the employment of a separate, very high pressure working fluid. The working fluid of the spool control stage is maintained separate and apart within the valve from the fluid flowing through the flow control stage, thereby permitting it to be different from, and at a substantially higher pressure than, said latter fluid. A very high pressure working fluid is desirable in many instances, especially where the spool must be accurately positioned in the presence of substantial G-forces and large rates of fluid flow, such as are encountered in guided missiles.

In the drawing, a valve body is generally indicated at 2, said body having a housing 4 for an electrical control system, integral therewith. If desired, the housing could be formed separately. The valve body 2 has an elongated bore 6 therein, said bore including a first control chamber 8, a second control chamber 10, a cylindrical valve seat 12, an enlarged inlet chamber 14, and an enlarged outlet chamber 16, the chambers 14 and 16 being concentrically disposed about the central axis of the bore 6 and being placed in communication with the exterior of the valve body 2 by an inlet port 18 and an outlet port 20, respectively.

Disposed within the bore 6 is a spool 22, consisting of a first control section 24, a second control section 26, a valve core section 28, and a connecting shaft 30. The spool 22 is shorter in length than the bore 6, whereby it can move in a reciprocating manner therein. A pair of frusto-conical stops 32 and 34 are disposed in the bore 6, one within each control chamber, and a coil spring 36 having a known force constant is disposed between the second control section 26 and the stop 34. The frusto-conical stops 32 and 34 substantially fill the control chamber behind the control sections 24 and 26, respectively, and limit the volume of the space behind these sections. Changes of pressure in the actuating fluid are transmitted to the valve much faster because of the diminished volume of actuating fluid. While the second control section 26 and the valve core section 28 of the spool are shown to be integral, it is to be understood that they may be constructed as individual elements.

The valve core 28 has an axially extending circumferential flow recess 38 therein, said recess opening at its outer end into the inlet chamber 14. Disposed about the circumference of the valve core 28 are a plurality of spaced flow slots 40. The flow slots 40 are generally rectangular in shape and are each of the same axial length; they serve to communicate recess 38 with the exterior of the valve core. The recess 38 and the flow slots 40 constitute a fluid passageway through the valve core section.

The valve core section 28 of the spool 22 is in sealed contact with the cylindrical valve seat 12, the clearance between the mating surfaces being just sufficient to allow the spool to move, or axially shift, relative to the seat. The valve is shown in a closed, non-conducting position in FIG. 1, the innermost ends of the slots being covered by valve seat 12.

When it is desired to have a first fluid flow through the flow control stage of the valve, the spool is axially shifted relative to the seat 12, whereby the inner ends of the slots 40 are exposed within the outlet chamber 16. Flow through the valve will begin as soon as the slots are so exposed. By having each of the slots of the same length, flow will initiate from each at the same instant. The rate of flow of the fluid is dependent upon the differential pressure between the inlet and the outlet chambers, and the area of the slots that is exposed; the greater the area exposed within the chamber 16, the greater will be the rate of flow. Flow through the valve is halted by axially shifting the spool to a position where the slots 40 are again covered by the seat 12.

The spool 22 is constructed to permit almost instantaneous fluid flow through the exposed portions of the slots 40 as soon as they become so exposed. This is accomplished by the use of the recess 38, which acts somewhat in the manner of a reservoir. As is seen in the drawing, the flow recess 38 has an axial length substantially greater than that of the flow slots 40, whereby it extends further into the valve core section 28 than do said slots. This greater length, combined with the continuous, circumferential nature of the recess, provides a chamber of fairly large volume from which fluid can flow outwardly through the slots 40 when they become exposed within the outlet chamber.

The position of the spool within the valve is determined by the spool control stage. This stage includes the first and second control chambers 8 and 10, a torque motor 42, a flapper 44, a first nozzle 46, a second nozzle 48 arranged in opposition to said first nozzle, a working fluid inlet port 50, a first connecting passageway 52, a second connecting passageway 54, and a working fluid outlet port 60. Disposed within each of the passageways 52 and 54 is a metering orifice, indicated at 56 and 58, respectively.

The construction and operation of torque motors such as that indicated at 42 is well known in the valve art, and hence will not be described in detail. A typical such motor is described in U.S. Patent 2,866,476, issued December 30, 1958, to George Orloff. Generally, the torque motor will be activated in response to an electrical signal, whereby it will position the flapper 44 at any desired position between the opposed nozzles 46 and 48.

The spool is axially shifted within the valve by forces exerted on the end faces of the control sections 24 and 26 by a pressurized working fluid contained within the control chambers 8 and 10. The value of the pressure exerted by the working fluid is regulated by the flapper 44, acting together with the nozzles 46 and 48.

The working fluid is the second fluid within the valve, and is prevented from mixing with the first fluid, which flows through the flow control stage, by having the control sections 24 and 26 of the spool 22 sealingly engage the walls of the chambers 8 and 10 within which they move. The second, or working, fluid is admitted to the valve through the port 50. It is then divided into two parts, one part flowing through the first passageway 52 into the first control chamber 8 and to the first nozzle 46, and the second part flowing through the second passageway 54 into the second control chamber 10 and to the second nozzle 48. The working fluid flows from each of the nozzles 46 and 48, and is returned to its source (not shown) through the outlet port 60.

The working fluid flows through the spool control stage under a high pressure. The sizes of the two passageways 52 and 54 and the nozzles 46 and 48 are so proportioned that the fluid pressure within each of the control chambers 8 and 10 will be identical when the flapper 44 is positioned midway between said nozzles. When the pressures within the said control chambers 8 and 10 are identical, the forces acting on the identical end faces of the control sections 24 and 26 will be in balance, and the spool 22 will remain in one position.

When it is desired to axially shift the spool 22 whereby to open the flow control stage, the flapper 44 is moved by the torque motor 42 to a position closer to the first nozzle 46. This restricts the flow of the working fluid from said nozzle, which causes an increase of pressure within the first control chamber 8. Correspondingly, the working fluid flows easier from the second nozzle 48, which results in a decrease in pressure within the second control chamber 10. Thus, the forces acting on the end faces of the control sections 24 and 26 are no longer in balance, and the spool will move toward the second chamber 10.

As the spool 22 moves, the spring 36 will be compressed. Such compression will continue until the force exerted on the end face of the second control section 26 by the combined effects of the compressed spring 36 and the pressurized working fluid contained within the second control chamber 10 equals the force exerted on the end face of the first control section 24. The spool will then stop moving, and will remain stationary until the forces acting upon it again become unbalanced.

As is obvious, the amount which the spool 22 is axially shifted is determined by the pressure within the chamber 8, which pressure is in turn determined by the position of the flapper 44. The closer the flapper 44 is positioned to the nozzle 46, the greater will be the fluid pressure within the chamber 8 and, correspondingly, the smaller will be the fluid pressure within the chamber 10. The force exerted by the spring 36, of course, is dependent upon its force constant and the degree to which it is compressed. It is thus seen that by properly designing the spool control stage, and the spring 36, the position of the spool 22, and hence the rate of flow through the valve, can be precisely controlled solely by properly positioning the flapper 44.

When it is desired to close the valve of FIG. 1, the flapper 44 is again returned to its midway position. This restores the fluid pressure balance in the chambers 8 and 10, and the spring 36 will expand to return the spool to its original position.

While the valve of FIG. 1 is shown to employ a spring, such is not absolutely necessary to its performance. The spring 36 may be eliminated, and the valve can be operated in what is referred to as a time dwell mode. The valve then functions as follows.

The torque motor 42 is so activated as to cause the flapper 44 to oscillate at a very high frequency, say 180 cycles per second, between its extreme positions. The flapper is first moved to cap the nozzle 46, in which position it will stay, or dwell, for a first specified period of time. During such dwell time, the pressure within the chamber 8 will be increasing at a maximum rate, and the spool will shift toward its open position at a maximum rate. The flapper is then moved to cap nozzle 48, where it dwells for a second specified period of time, causing the spool to shift toward its closed position at a maximum rate. If the dwell time at each nozzle is equal, the spool will tend to oscillate about one point, and the net effect will be to maintain it in substantially the same position. If the dwell time at one nozzle is greater than the dwell time at the other nozzle, the net effect will be to cause the spool to shift axially by incremental amounts. Thus, when it is desired to open the valve, the dwell time at nozzle 46 is increased relative to the dwell time at nozzle 48. This results in an incremental axial shifting of the spool. When the spool has shifted sufficiently to give the desired rate of flow, the dwell time is made equal at each nozzle, and the spool will oscillate about its open position. When it is desired to close the valve, the dwell time at nozzle 48 will be increased over that at nozzle 46, and the spool will axially shift, again by incremental amounts, to its closed position.

The frusto-conical configuration of the stops 32 and 34 insures that there will at all times be a volume in the control chambers 8 and 10 within which the working fluid can be contained, even when the control sections of the valve extend as far as possible within their respective control chambers. The particular configuration of the stops is not critical and accordingly can be varied, so long as some such minimum volume is present; and the stops, while shown to be separate elements, may be constructed integral with the valve body if so desired.

While it is contemplated that the seal between the moving elements of the valve will be obtained solely by the use of precise, lapped fits, it may be desired to employ additional sealing means, such as O-rings seated in grooves in either of the circumferential mating surfaces.

Obviously, many modifications and variations of the present invention are possible in the light of the above teachings. It is therefore to be understood that within the scope of the appended claims the invention may be practiced otherwise than as specifically described.

What is claimed is:

1. A uni-directional flow control valve, comprising a valve body having an elongated bore therein, said bore including, in axially aligned relationship, a pair of cylindrical, spaced control chambers closed at their respective outer ends, an inlet chamber positioned between said pair of control chambers and immediately adjacent one thereof, an outlet chamber also positioned between said pair of control chambers and immediately adjacent the other thereof, and a cylindrical valve seat having a diameter smaller than those of said inlet and outlet chambers and extending therebetween, said inlet and outlet chambers being in communication with the exterior of said body, a spool axially shiftable within said bore and having a length less than the length of said bore but greater than the distance between said control chambers, said spool including a pair of spaced control sections each of a uniform diameter throughout, each control section being in sealed engagement with the wall of one of said control chambers, a pressurized fluid in said control chambers and activating said control sections, a cylindrical valve core section in sealed engagement with said seat and being disposed between said control sections and connected to one thereof, said one control section and said core section having a uniform diameter throughout the combined lengths thereof, and a reduced-in-diameter shaft connecting said core section and the other of said control sections and extending therebetween and across said inlet chamber, said core section having passageway means therein, said passageway means including an axially extending annular flow recess disposed within said core and opening at one end into said inlet chamber about said shaft, the other end of said recess being closed, and a plurality of axially extending, identical-in-length, rectangular flow slots spaced about the circumference of said core section and extending inwardly from the inlet chamber end thereof, said flow slots communicating said recess with the exterior of said core and being shorter in length than said recess, whereby as said spool is axially shifted toward said outlet chamber the slots are progressively exposed therewithin to thereby establish a fluid flow passageway between said chamber and said inlet chamber, and stop members, each formed with a frusto-conical portion substantially filling said control chambers to diminish the volume of activating fluid and to render a rapid response of the control sections to changes of pressure in said activating fluid, said stop members limiting the axial shifting movement of said spool so that said control sections remain constantly in sealed engagement with their respective control chambers whereby pressurized fluid contained within the inlet and the outlet chambers of the valve is sealed from said control chambers.

2. A flow control valve as recited in claim 1, including additionally resilient means disposed within the other of said control chambers for normally urging said spool toward said inlet chamber to thereby close the flow passageway through said valve.

References Cited in the file of this patent

UNITED STATES PATENTS

| | | |
|---|---|---|
| 937,828 | Little | Oct. 26, 1909 |
| 1,819,043 | Sleeper et al. | Aug. 18, 1931 |
| 2,655,940 | Jackson | Oct. 20, 1953 |
| 2,698,030 | Lehner | Dec. 28, 1954 |
| 2,800,143 | Keller | July 23, 1957 |
| 2,866,476 | Orloff | Dec. 30, 1958 |
| 2,915,077 | Wehrli et al. | Dec. 1, 1959 |
| 2,995,337 | Tanner | Aug. 8, 1961 |

FOREIGN PATENTS

| | | |
|---|---|---|
| 1,226,698 | France | Feb. 29, 1960 |